United States Patent

Sofman et al.

[11] Patent Number: 5,959,975
[45] Date of Patent: Sep. 28, 1999

[54] METHOD OF TELECOMMUNICATIONS DEMAND-ROUTE MULTIPLEXING (DEROM)

[75] Inventors: Lev B. Sofman; Sridhar S. Nathan, both of Plano, Tex.

[73] Assignee: MCI World Com, Inc., Ga.

[21] Appl. No.: 08/862,290

[22] Filed: May 23, 1997

[51] Int. Cl.$^6$ .............................. H04L 12/24; H04Q 11/04
[52] U.S. Cl. ...................... 370/238; 370/254; 395/200.71
[58] Field of Search ..................................... 370/216, 225, 370/228, 229, 230, 231, 235, 236, 237, 238, 252, 254, 255, 351, 400, 539, 541; 340/825.01, 825.03, 826, 827; 395/181, 182.01, 182.02, 200.64, 200.65, 200.68, 200.69, 200.7, 200.71, 200.72, 500

[56] References Cited

U.S. PATENT DOCUMENTS

| | | | |
|---|---|---|---|
| 5,317,566 | 5/1994 | Joshi | 370/238 |
| 5,564,021 | 10/1996 | Qiu et al. | 370/431 |
| 5,608,721 | 3/1997 | Natarajan et al. | 370/238 |
| 5,657,142 | 8/1997 | Fahim | 370/238 |
| 5,729,692 | 3/1998 | Qiu et al. | 395/200.71 |
| 5,787,271 | 7/1998 | Box et al. | 395/500 |

Primary Examiner—Alpus H. Hsu

[57] ABSTRACT

A method of optimizing a telecommunications network in terms of transmission and equipment cost by multiplexing lower bandwidth level telecommunications demand-routes to form higher bandwidth level bundles, by determining, for each demand-route, whether the demand-route includes a patching subroute. For each patching subroute, the method finds a best bundle of demand-routes that includes the patching subroute. The best bundle is the one that has the highest cost gradient between the sum of the costs associated with the demand-routes included in the best bundle and the total cost associated with the best bundle. The method then multiplexes the demand-routes according to the best bundles.

23 Claims, 4 Drawing Sheets

METHOD OF TELECOMMUNICATIONS DEMAND-ROUTE MULTIPLEXING (DEROM)

CROSS-REFERENCE TO RELATED APPLICATION

The present Application is related to application Ser. No. 08,863,050, (Attorney Docket No. RIC-96-122 (20350.00020)), filed May 23, 1997, titled Method of Routing and Multiplexing Demands in a Telecommunications Network, and assigned to the Assignee of the present Application, the disclosure of which is incorporated herein for all purposes.

FIELD OF THE INVENTION

The present invention relates generally to communication network design and more particularly to a method of optimizing a telecommunications network in terms of transmission and equipment cost by multiplexing lower bandwidth level telecommunications demand-routes to form higher bandwidth level bundles.

DESCRIPTION OF THE PRIOR ART

Modern digital telecommunications systems are built upon a hierarchical network. The network consists of a plurality of nodes or sites that are interconnected by transmission facilities. Generally, lower bandwidth level demands are multiplexed or bundled into higher bandwidth level demands. For example, up to twelve 44.736 mbps DS3 channels may be multiplexed into a single 622.08 mbps OC-12 channel. Similarly, up to sixteen OC-12 channels may be multiplexed into a single OC-192 channel.

It is a goal of telecommunications network design to serve the demand at the least cost. Two elements of cost in a network are transmission cost and equipment cost. The transmission cost is based on the transmission distance multiplied by the cost per unit of distance of the transmission media per line multiplied by the number of lines necessary to meet the demand. An element of equipment cost is the cost per port necessary to multiplex multiple channels into a single channel.

Transmission cost can be minimized by multiplexing as much demand as possible into as few transmission channels as possible. However, equipment costs may be minimized by multiplexing as few channels as possible. Thus, transmission costs and equipment costs compete with each other and optimization of a network requires tradeoffs.

To illustrate the tradeoffs, consider a simple network that consists of two demand-routes. The first demand-route carries a demand of 7 DS3 units a distance of 240 miles from points A to B via points C and D. The second demand-route carries a demand of 4 DS3 units a distance of 220 miles from points E to F via points B and C. The common portion of the two demand-routes, subroute B–C, has a mileage of 40 miles. Points B and C are patching points in that they are equipped to multiplex separate channels into common channels. It is possible to satisfy these demands without bundling by providing two OC-12 express trucks with a total mileage of 460 miles. It is also possible to satisfy the demand by bundling the routes to transmit both demands through a single OC-12 trunk from points B to C and reduce the total mileage to 420 miles by eliminating one 40 mile trunk. However, the unbundled case requires 4 ports, whereas the bundled case requires 10 ports.

If we assume that the transmission component of the cost function is 0.2 cost units per transmission mile and 0.8 cost units per port, then we can calculate the cost without bundling, the cost with bundling, and the cost gradient, which is the cost without bundling minus the cost with bundling. In this example, the cost without bundling is 95.2 cost units while the cost with bundling is 92 cost units. Accordingly, the cost gradient is a positive 3.2, which indicates that, for this example, it is preferable to bundle. However, it will recognized that, depending upon the mileages and number of demand-routes that share a common patching subroute, it may not always be best to bundle. Real world networks are complex systems with hundreds of nodes. Accordingly, network optimization is very difficult. It is therefore an object of the present invention to provide a computationally efficient method of optimizing a telecommunications network.

SUMMARY OF THE INVENTION

The present invention provides a method of optimizing a telecommunications network in terms of transmission and equipment cost by multiplexing lower bandwidth level telecommunications demand-routes to form higher bandwidth level bundles. For each demand-route, the method of the present invention determines whether the demand-route includes a patching subroute. For each patching subroute, the method finds a best bundle of demand-routes that includes the patching subroute. The best bundle is the one that has the highest cost gradient. Cost gradient is the difference between the cost without bundling and the cost with bundling. The method then multiplexes the demand-routes according to the best bundles.

The method finds a best bundle of demand-routes by setting a best cost gradient equal to a selected value. The method then selects a bundle of demand-routes that include the patching subroute and calculates a cost gradient for the selected bundle. Whenever a calculated cost gradient is greater than the set best cost gradient, the method sets the best cost gradient equal to the calculated cost gradient and identifies the selected bundle as the best bundle. The method iterates through the foregoing steps until all combinations of demand-routes that include the patching subroute have been selected. Then, the method iterates through all of the patching subroutes, thereby finding a best bundle for each patching subroute.

The method excludes from its search for best bundles those demand-routes that would not benefit from bundling. For example, the method excludes any demand-route that includes a number of lower bandwidth demands equal to an integer multiple of an express parameter, which is an integer multiple of the multiplex level ratio. The multiplex level ratio is the ratio of the higher bandwidth level to the lower bandwidth level. For example, when the lower bandwidth level is DS3 and the higher bandwidth level is OC-12, the multiplex level ratio is twelve.

Additionally, the method excludes any demand-route that includes a number of lower bandwidth demands equal to or greater than an integer multiple of the express parameter plus a predetermined threshold value. Finally, whenever a demand-route includes a number of lower bandwidth demands less than an integer multiple of the express parameter plus the predetermined threshold value, the method partitions the demand-route into a first demand subroute having a number of lower bandwidth demands equal to the integer multiple of the express parameter and a second demand subroute having the remaining lower bandwidth demands. The method excludes the first demand subroute from bundling.

The method of the present invention is implemented in a computer system by defining data structures including a patching subroute set, a temporary array, and a final array. In an initial phase of the method of the present invention, the demand-routes that include a patching subroute and have fewer than the predetermined lower bandwidth demand threshold are placed in the temporary array. Each patching subroute is included in the patching subroute set. Those demand-routes that are determined not to include a patching subroute, and those that are determined not to be candidates for bundling are placed in the final array.

In an iterative phase of the computer implemented method of the present invention, the method works with the demand-routes in the temporary array to find the best bundles. The method selects a patching subroute from the patching subroute set and sets a best cost gradient equal to a selected value, preferably equal to zero. Then, the method selects from the temporary array a bundle of demand-routes that include the patching subroute and calculates a cost gradient for the selected bundle. Whenever a calculated cost gradient is greater than the set best cost gradient, the method sets the best cost gradient equal to the calculated cost gradient and identifies the selected bundle as the best bundle. The method repeats the foregoing steps until all combinations of demand-routes that include the patching subroute have been selected, thereby identifying the best bundle for the patching subroute.

The method then partitions the best bundle into a partition that includes the patching subroute and remaining parts of the demand-routes comprising the best bundle, and moves the partitioned patching subroute to the final array. The method includes the remaining parts in the temporary array, and deletes the original demand-routes that comprised the best bundle from the temporary array.

The method then selects the next patching subroute and iterates through the foregoing steps to find the best bundle for the next patching subroute. The method continues to iterate until all patching subroutes in the patching subroute set have been selected. When all of the patching subroutes have been selected, the method moves the remaining contents of the temporary array to the final array.

DESCRIPTION OF THE PREFERRED EMBODIMENT

Figure 1:
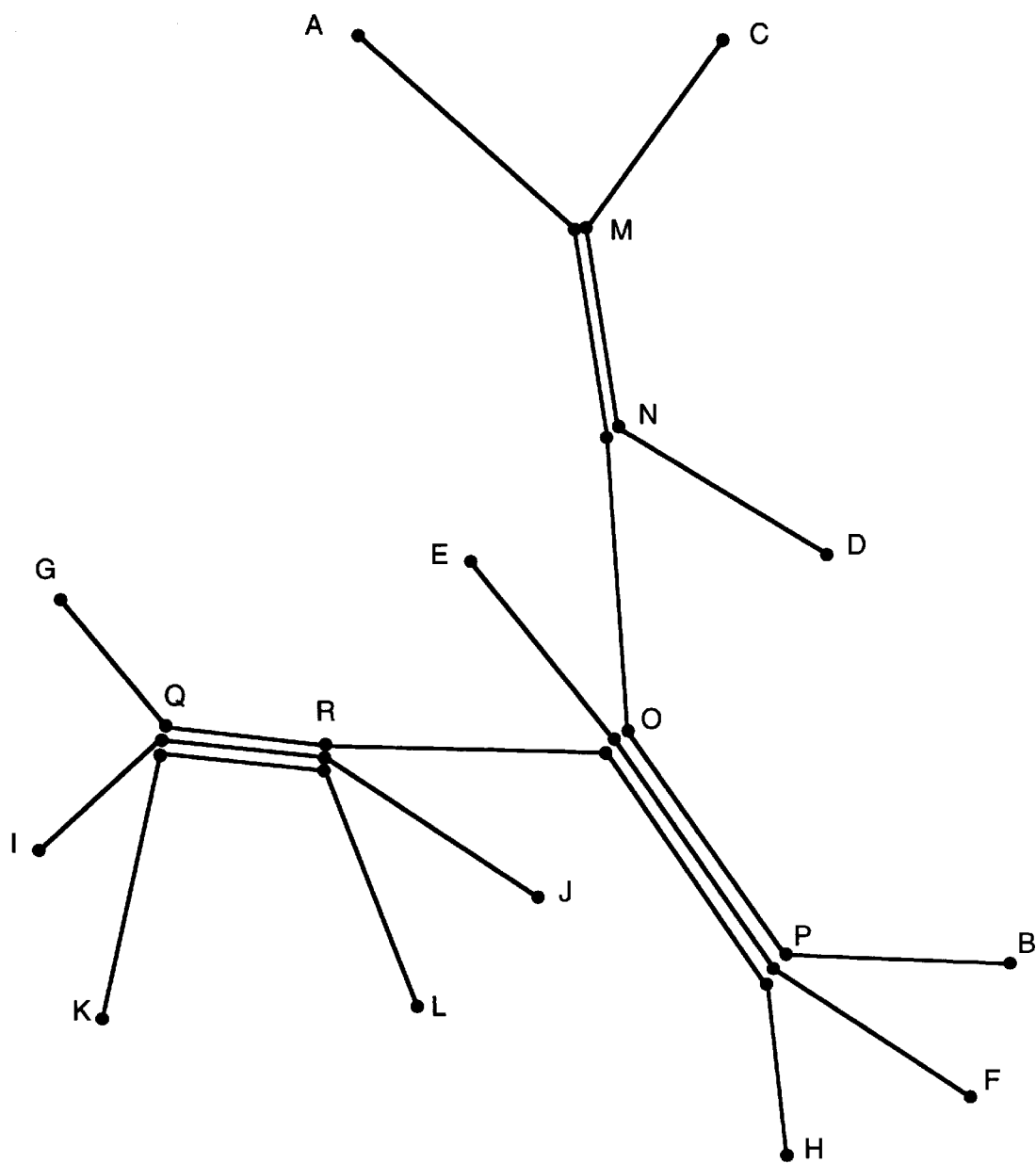
FIG. 1 is a network diagram illustrating the concepts involved in the method of the present invention.

Referring now to the drawings, and first to FIG. 1, a relatively simple network is illustrated. The network consists of nodes A–R that are connected by OC-12 channels as shown. The network also consists of six demand-routes as follows: {A–B, 4 DS3}; {C–D, 3DS3}; {E–F, 6DS3}; {G–H, 4DS3}; {I–J, 6DS3}; and {K–L, 12DS3}.

The object of the method of the present invention is to minimize the total network cost, in terms of transmission and equipment, of the network by bundling appropriate sets of demand-routes. The method of the present invention is implemented in a computer system in which three working data structures are defined. The data structures include a patching subroute set, a temporary array, and a final array. The data structures are initially empty and the method of the present invention works by moving data into, out of, and between the various data structures.

The method of the present invention has three phases, including an initial phase, an iterative phase, and a final phase. In the initial phase, data are inserted into the data structures. After the system has been initialized by inputting network specific information including lists of demand-routes, mileage, and patchable nodes, as well as cost and multiplex threshold and ratio data, the system creates a demand-route record for each demand-route. Then, the system determines, for each demand-route, whether or not a particular demand-route has any patching subroutes. A demand-route that does not have any patching subroutes is inserted into the final array. Each demand-route that has a patchable subroute is processed further in the initial phase.

In the network of FIG. 1, the system starts with demand-route A–B, which carries 4DS3 from node A to node B. In the network, nodes M and N are not patchable nodes. Therefore, M–N is not a patchable subroute. However, nodes O and P are patchable nodes. Accordingly, demand-route A–B is inserted into the temporary array and patching subroute O–P is inserted in the patching subroute set. Since M–N is not a patching subroute, demand-route C–D is not a candidate for bundling and it is placed into the final array.

It will be observed in FIG. 1 that demand-route E–F includes patchable subroute O–P. Accordingly, demand-route E–F is placed in the temporary array. Demand-route G–H includes not only patchable subroute O–P, but also a subroute Q–R. In the network, nodes Q and R are patchable nodes. Accordingly, Q–R is a patching subroute. Thus, patching subroute Q–R is placed in the patching subroute set and demand-route G–H is placed in the temporary array. Since demand-route I–J includes patching subroute Q–R, it too is placed in the temporary array. Demand-route K–L also includes patching subroute Q–R. However, it will be noted that demand-route K–L carries a demand of 12DS3. Since 12DS3 is equivalent to one OC-12 transmission channel, demand-route K–L is not a candidate for bundling and it is placed in the final array.

At the conclusion of the initial phase, the contents of the data structures are as shown in the following Table 1:

TABLE 1

| PATCHING SUBROUTE SET | TEMPORARY ARRAY | FINAL ARRAY |
| --- | --- | --- |
| O-P | A-B | C-D |
| Q-R | E-F | K-L |
|  | G-H |  |
|  | I-J |  |

In the iterative phase, the method of the present invention identifies, for each patching subroute, a best bundle. A best bundle is one that has the best cost gradient as compared to the other bundles that can be formed from the demand-routes that include a particular patching subroute. Cost gradient is the difference between the unbundled cost and the bundled cost.

In the iterative phase, the method first considers patching subroute O–P and the demand-routes associated with it. Since patching subroute O–P is associated with three demand-routes, there are three candidate bundles taken two demand-routes at a time and one candidate bundle that includes all three demand-routes. The system arithmetically tests each potential bundle to find the one with the best cost gradient. Assuming that the best cost gradient is for the bundle comprising demand-routes G–H and A–B, the method of the present invention partitions those demand-routes and moves patching subroute O–P to the final array. The system then deletes original demand-routes A–B and G–H from the temporary array and inserts fragments A–O, G–O, P–B, and P–H into the temporary array. Finally, the method deletes patching subroute O–P from the patching subroute set. Accordingly, at the end of the first iteration, the contents of the data structures are as shown in Table 2.

TABLE 2

| PATCHING SUBROUTE SET | TEMPORARY ARRAY | FINAL ARRAY |
| --- | --- | --- |
| Q-R | E-F | C-D |
|  | I-J | K-L |
|  | A-O | O-P |
|  | G-O |  |
|  | P-B |  |
|  | P-H |  |

In the next iteration of the iterative phase, the method considers demand-routes G–O and I–J, which are associated with patching subroute Q–R. Since there are only two demand-routes, there is only one potential bundle. The method calculates the cost gradient for the bundle, and assuming that it is greater than 0, the method partitions the bundle into common patching subroute Q–R and fragments G–Q, I–Q, R–O, and R–J. The method inserts patching subroute Q–R into the final array, deletes original demand-routes G–O and I–J from the temporary array, and inserts fragments G–Q, I–Q, R–O, and R–J into the temporary array, and deletes patching subroute Q–R from the patching subroute set.

Thus, at the end of the second iteration, the data structures appear as shown in Table 3.

TABLE 3

| PATCHING SUBROUTE SET | TEMPORARY ARRAY | FINAL ARRAY |
| --- | --- | --- |
|  | E-F | C-D |
|  | A-O | K-L |
|  | P-B | O-P |
|  | P-H | Q-R |
|  | G-Q |  |
|  | I-Q |  |
|  | R-O |  |
|  | R-J |  |

Since the patching subroute set is now empty, the iterative phase is complete. In the final phase, the contents of the temporary array are moved to the final array and the fragments are bundled with their associated patching subroute.

Figure 2:
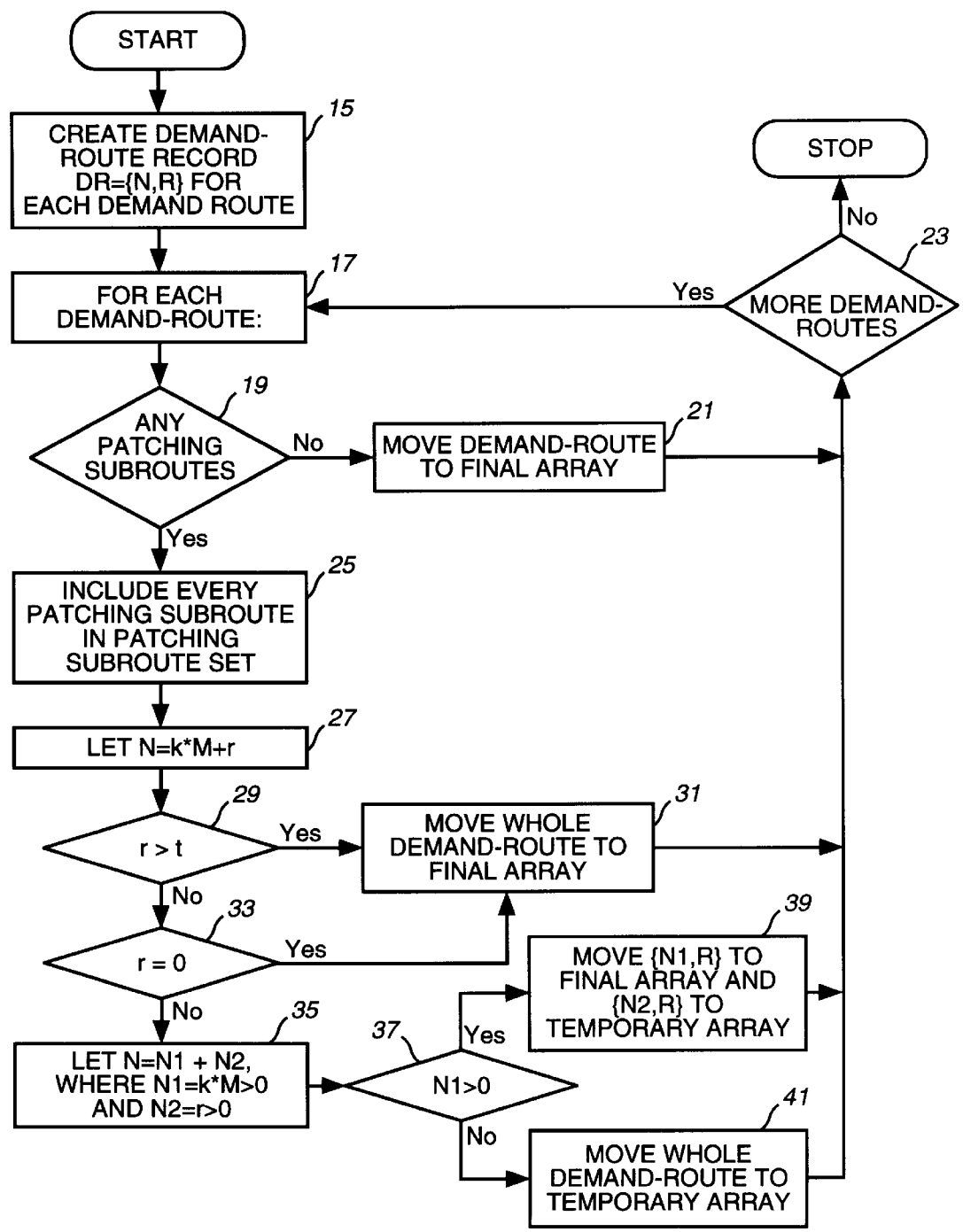
FIG. 2 is a flowchart of the initial phase of the method of the present invention.

Referring now to FIG. 2, there is shown a flowchart of a preferred software implementation initial phase of the method of the present invention. A demand-route record is created for each demand-route at block 15. Then, at block 17, the method proceeds to iterate through each demand-route record. For each demand-route, the system tests at decision block 19 whether the demand-route includes any patching subroutes. If not, the system moves the demand-route to the final array, at block 21, and tests, at decision block 23 whether there are any more demand-routes. If so, the method returns to block 17 to consider another demand-route.

If at decision block 19, the demand-route has any patching subroutes, the method includes every patching subroute in the patching subroute set, at block 25. Then, the method executes various tests to determine whether the demand-route is a candidate for bundling or should be handled as an express route. First, at block 27, the method lets N equal k*M+r, where N is the number of low bandwidth level demands in the demand-route, k is an integer (0, 1, 2, . . . ), M is the express parameter, and r is a remainder. The express parameter is an integer multiple of the multiplex level ratio, which is the ratio between the lower bandwidth level and the higher bandwidth level. Usually, but not always, the express parameter is equal to the multiplex level ratio. Thus, when multiplexing from DS3 to OC-12, M is equal to twelve. However, in the case of multiplexing from OC-12 to OC-192, in which the multiplex level ratio is sixteen, it is necessary to have one protected channel for each group of three or fewer OC-192 channels. Therefore, if the network under consideration were, for example, multiplexing from OC-12 to OC-192, M is chosen to be equal to forty-eight.

The system tests at decision block 29 whether r is greater than T. T is a threshold selected by the network designer to eliminate from consideration for bundling those demand-routes that are almost full. In the preferred embodiment for the DS3 to OC-12 case, T is selected at nine so that demand-routes carrying ten or eleven DS3 units are not considered for bundling. Thus, if r is greater than nine at decision block 29, the whole demand-route is moved to the final array at block 31. If r is not greater than T, the method tests at decision block 33 whether r is equal to 0. Remainder r is equal to 0 whenever N is an integral multiple of M. If so, the method again moves the whole demand array to the final array at block 31. If, at decision block 33, r is not equal to 0, then, in the DS3 to OC-12 example, N is some integral multiple of twelve DS3 units plus a remainder of between one and nine DS3 units. Accordingly, at block 35, the method lets N=N1+N2, where N1 is an integral multiple of M greater than 0 and N2 equals r greater than 0. Thus, the method separates the demand into whole OS-12 demands and a remaining DS3 demand. The method tests at decision block 37 whether N1 is greater than 0. If so, the method partitions the demand-route into a demand-route {N1, R}, which it moves to the final array, and a demand-route {N2, R}, which it moves to the temporary array, all at block 39. If, at decision block 37, N1 is not greater than 0, then the method moves the whole demand-route to the temporary array at block 41.

Figure 3:
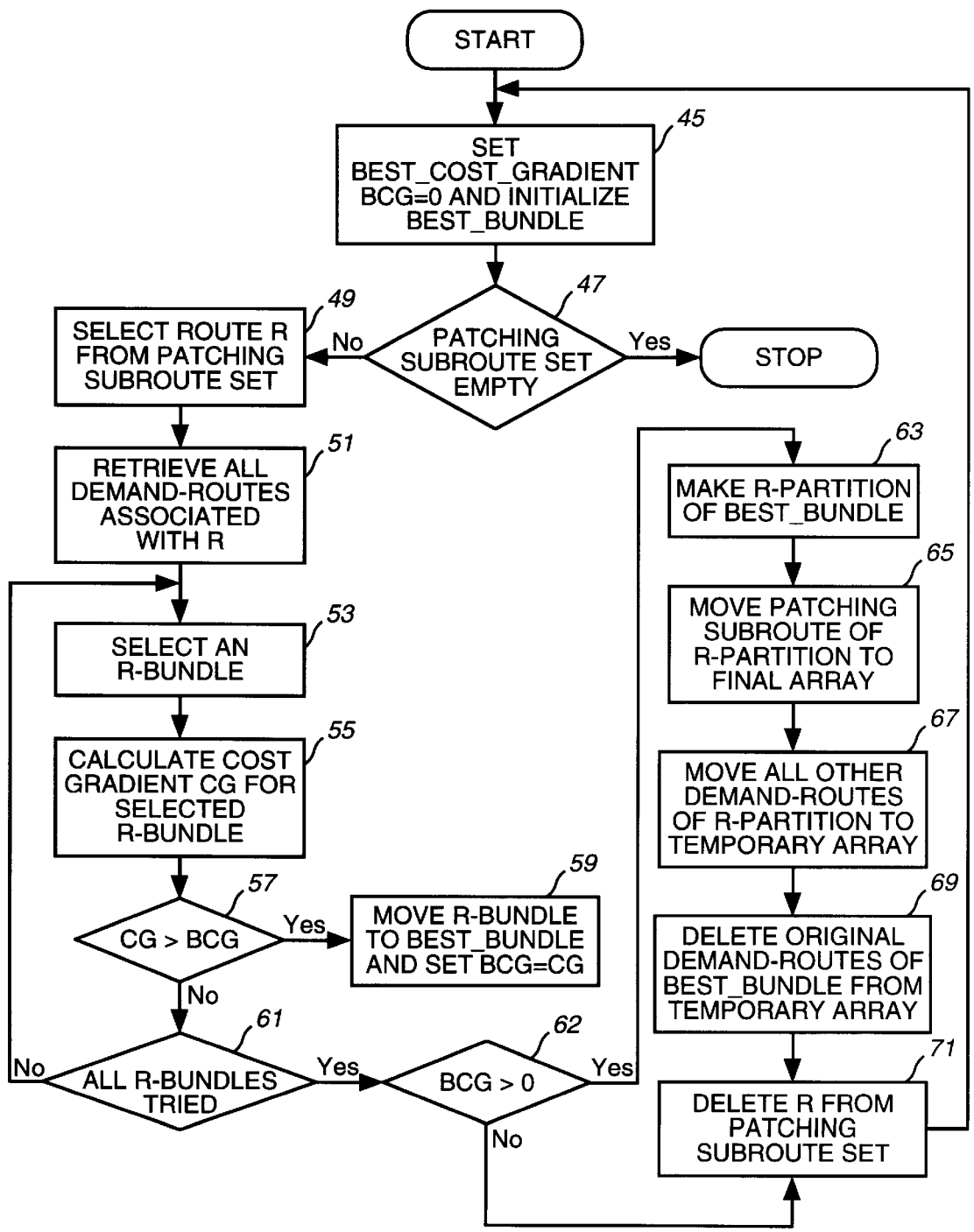
FIG. 3 is a flowchart of the iterative phase of the method of the present invention.

After each iteration, the system tests at decision block 23 whether or not there are more demand-routes. If not, the method goes to the iterative phase, which is depicted in FIG. 3. At the end of the initial phase, the patching subroute set includes every patching subroute in the network, the temporary array contains every demand-route having a number of demands less than the threshold, and the final array contains all of the demand-routes that are not candidates for bundling. Thus, when the method moves to the iterative phase, only candidates for bundling are considered.

Referring now to FIG. 3, the iterative phase of the method of the present invention begins at block 45 where the best cost gradient is set equal to 0 and the best bundle is initialized. Then the method tests, at decision block 47, whether the patching subroute set is empty. If not, the method selects a route R from the patching subroute set, at block 49, and retrieves all demand-routes associated with R at block 51. Then, the method iteratively tries all possible bundles of demand-routes associated with patching subroute R to find the one with the best cost gradient. First, the method selects an R-bundle at block 53. Then, the system calculates the cost gradient for the selected R-bundle at block 55. It will be recalled that cost gradient is the difference between the equipment and transmission costs associated with the demand-routes unbundled and bundled. The method tests at decision block 57 whether or not the cost gradient for the selected R-bundle is greater than the best cost gradient, which is initially set at 0. If so, the method moves the R-bundle to the best bundle and sets the best cost gradient equal to the calculated cost gradient, at block 59. Then the method tests, at decision block 61, whether all R-bundles have been tried. If not, the method returns to block 53 and selects another R-bundle. The method iterates through this loop until all R-bundles have been tried, at which time the best bundle with the best cost gradient has been found, if one exists.

After all R-bundles have been tried, the system tests at decision block 62 whether the best cost gradient is greater than 0. It may be that there is no cost advantage in bundling any of the demand-routes associated with a particular patching subroute. If the best cost gradient is not greater than 0, the method deletes R from the patching subroute set at block 71, and returns for another iteration. If, at decision block 62, the best cost gradient is greater than 0, the method makes an R partition of the best bundle at block 63. By making an R partition, the method breaks the best bundle into its patching subroute and its remaining fragments. The method moves the patching subroute of the R partition to the final array at block 65 and moves the fragments in the R partition to the temporary array at block 67. Then, the method deletes the original demand-routes of the best bundle from the temporary array at block 69. Finally, the method deletes patching subroute R from the patching subroute set at block 71 and returns to block 45 to reset the best cost gradient to 0 and initialize the best bundle.

The method iterates through the iterative phase until, at decision block 47, the patching subroute set is determined to be empty at decision block 47. When the patching subroute is empty, then all of the best bundles have been found and the method moves to the final stage, as illustrated in FIG. 4.

Figure 4:
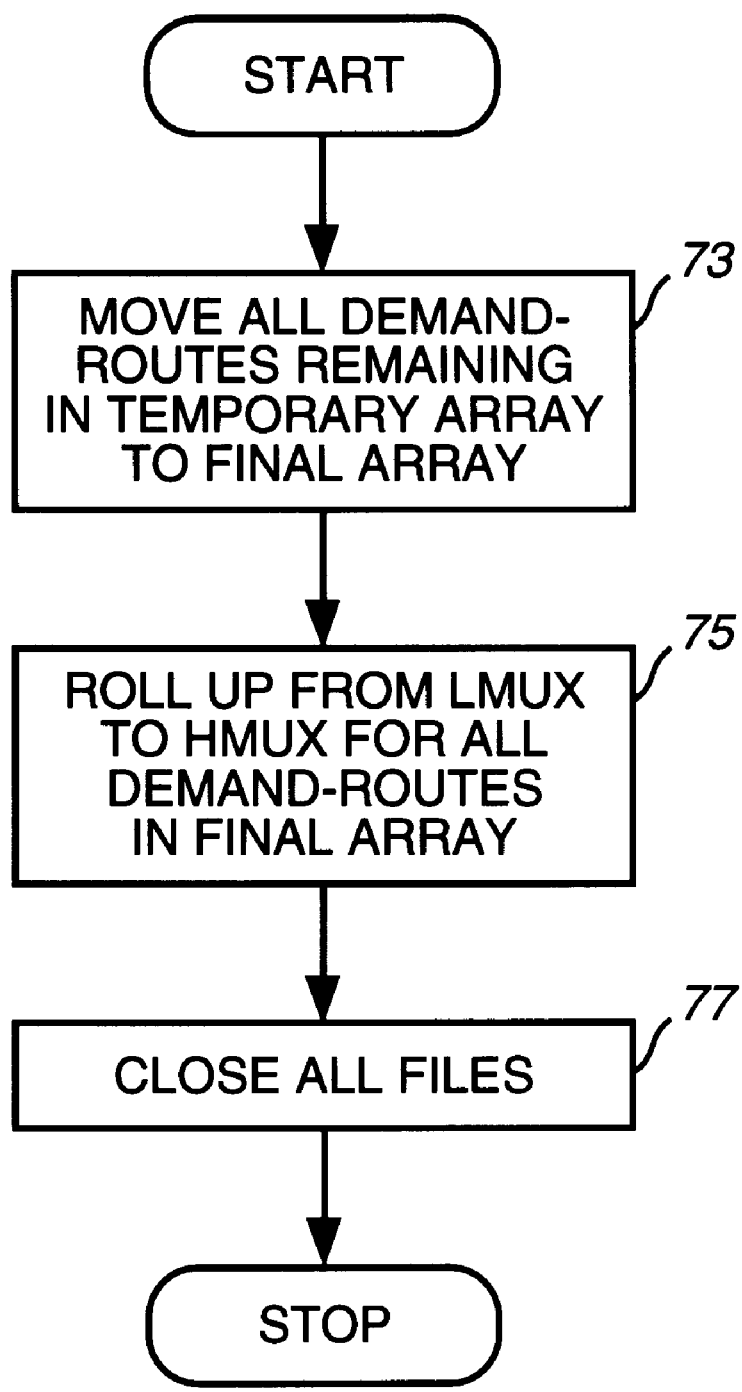
FIG. 4 is a flowchart of the final phase of the method of the present invention.

Referring now to FIG. 4, in the final phase, the method moves all demand-routes remaining in the temporary array to the final array at block 73. Then, the method rolls up from the low demand level to the high demand level all demand-routes in the final array, at block 75. The method concatenates the demand-route fragments to their associated patching subroutes for multiplexing. Finally, the method closes all files at block 77, and the optimization process is finished.

From the foregoing, it may be seen that the method of the present invention provides a computationally efficient process for bundling demand-routes in complex networks. The method minimizes total network cost by finding, for each potential bundle, the bundle with the greatest cost gradient in terms of transmission and equipment costs.

What is claimed is:

1. A method of multiplexing lower bandwidth level telecommunications demand-routes to form higher bandwidth level bundles, there being a multiplex level ratio defined between said lower bandwidth level and said higher bandwidth level, each of said demand-routes having a cost associated therewith, which comprises the computer implemented steps of:

for each demand-route, determining whether said demand-route includes a patching subroute;

for each patching subroute, finding a best bundle of demand-routes that includes said patching subroute, said best bundle having a highest cost gradient between the sum of the costs associated with the demand-routes included in said best bundle and the total cost associated with said best bundle; and, multiplexing said demand-routes according to said best bundles.

2. The method as claimed in claim 1, wherein said step of finding a best bundle of demand-routes includes the computer implemented steps of:

(a) setting a best cost gradient equal to a selected value;

(b) selecting a bundle of demand-routes that include said patching subroute;

(c) calculating a cost gradient for said selected bundle;

(d) whenever a calculated cost gradient is greater than the set best cost gradient, setting the best cost gradient equal to the calculated cost gradient and identifying the selected bundle as the best bundle; and, (e) repeating steps (b) through (d) until all combinations of demand-routes that include said patching subroute have been selected.

3. The method as claimed in claim 2, wherein said selected value is zero.

4. The method as claimed in claim 1, including the computer implemented step of:

excluding from bundling any demand-route that includes a number of lower bandwidth demands equal to an integer of an express parameter.

5. The method as claimed in claim 4, wherein said express parameter is an integer multiple of said multiplex level ratio.

6. The method as claimed in claim 1, including the computer implemented step of:

excluding from bundling any demand-route that includes a number of lower bandwidth demands equal to or greater than an integer multiple of an express parameter plus a predetermined threshold value.

7. The method as claimed in claim 1, including the computer implemented steps of:

for each demand-route, determining whether said demand-route includes a number of lower bandwidth demands less than an integer multiple of an express parameter plus a predetermined threshold value;

partitioning a demand-route determined to include a number of lower bandwidth demands less than an integer multiple of said express parameter plus a predetermined threshold value into a first demand subroute having a number of lower bandwidth demands equal to said integer multiple of said express parameter and a second demand subroute having the remaining lower bandwidth demands; and, excluding said first demand subroute from bundling.

8. The method as claimed in claim 1, including the computer implemented steps of:

defining a patching subroute set;

defining a temporary array; and, defining a final array.

9. The method as claimed in claim 8, including the computer implemented step of:

including each patching subroute in said patching subroute set.

10. The method as claimed in claim 8, including the computer implemented step of:

including each demand-route determined not to include a patching subroute in said final array.

11. The method as claimed in claim 8, including the computer implemented step of:

including in said final array each demand-route that includes a number of lower bandwidth demands equal to an integer multiple of an express parameter.

12. The method as claimed in claim 8, including the computer implemented step of:

including in said final array each demand-route that includes a number of lower bandwidth demands equal to or greater than an integer multiple of an express parameter plus a predetermined threshold value.

13. The method as claimed in claim 8, including the computer implemented steps of:

for each demand-route determined to include a patching subroute, determining whether said demand-route includes a number of lower bandwidth demands less than an integer multiple of an express parameter plus a predetermined threshold value;

partitioning a demand-route determined to include a number of lower bandwidth demands less than an integer multiple of said express parameter plus a predetermined threshold value into a first demand subroute having a number of lower bandwidth demands equal to said integer multiple of said express parameter and a second demand subroute having the remaining lower bandwidth demands;

including said first demand subroute in said final array; and, including said second demand subroute in said temporary array.

14. The method as claimed in claim 8, including the computer implemented step of:

including in said temporary array each demand-route determined to include a patching subroute and that includes a number of lower bandwidth demands less than a predetermined threshold value.

15. The method as claimed in claim 14, wherein said step of finding a best bundle of demand-routes that includes a patching subroute includes the computer implemented steps of:

(a) selecting a patching subroute from said patching subroute set;

(b) setting a best cost gradient equal to a selected value;

(c) selecting from said temporary array a bundle of demand-routes that include said patching subroute;

(d) calculating a cost gradient for said selected bundle;

(e) whenever a calculated cost gradient is greater than the set best cost gradient, setting the best cost gradient equal to the calculated cost gradient and identifying the selected bundle as the best bundle;

(f) repeating steps (c) through (e) until all combinations of demand-routes that include said patching subroute have been selected;

(g) partitioning the best bundle into a partition that includes said patching subroute and remaining parts of the demand-routes comprising said best bundle;

(h) moving said partitioned patching subroute to said final array;

(i) including said remaining parts in said temporary array;

(j) deleting the demand-routes comprising said best bundle from said temporary array; and, (k) repeating steps (a) through (j) until all patching subroutes in said patching subroute set have been selected.

16. The method as claimed in claim 15, wherein said selected value is zero.

17. The method as claimed in claim 15, including the computer implemented step of:

after step (k), moving the contents of the temporary array to the final array.

18. A method of multiplexing lower bandwidth level telecommunications demand-routes to form higher bandwidth level bundles, there being a multiplex level ratio defined between said lower bandwidth level and said higher bandwidth level, each of said demand-routes having a cost associated therewith, which comprises the computer implemented steps of:

defining a patching subroute set;

defining a temporary array;

defining a final array;

for each demand-route, determining whether said demand-route includes a patching subroute;

including in said patching subroute set each patching subroute;

including in said final array each demand-route determined not to include a patching subroute;

including in said temporary array each demand-route determined to include a patching subroute and that includes a number of lower bandwidth demands less than a predetermined threshold value;

including in said final array each demand-route that includes a number of lower bandwidth demands equal to an integer multiple of an express parameter;

including in said final array each demand-route that includes a number of lower bandwidth demands equal to or greater than an integer multiple of said express parameter plus a predetermined threshold value;

for each patching subroute in said patching subroute set, finding a best bundle of demand-routes in said temporary array that includes said patching subroute, said best bundle having a highest cost gradient between the sum of the costs associated with the demand-routes included in said best bundle and the total cost associated with said best bundle; and, multiplexing said demand-routes according to said best bundles.

19. The method as claimed in claim 18, including the computer implemented steps of:

for each demand-route determined to include a patching subroute, determining whether said demand-route includes a number of lower bandwidth demands less than an integer multiple of said express parameter plus a predetermined threshold value;

partitioning a demand-route determined to include a number of lower bandwidth demands less than an integer multiple of said express parameter plus a predetermined threshold value into a first demand subroute having a number of lower bandwidth demands equal to said integer multiple of said express parameter and a second demand subroute having the remaining lower bandwidth demands;

including said first demand subroute in said final array; and, including said second demand subroute in said temporary array.

20. The method as claimed in claim 18, wherein said step of finding a best bundle of demand-routes that includes a patching subroute includes the computer implemented steps of:

(a) selecting a patching subroute from said patching subroute set;

(b) setting a best cost gradient equal to a selected value;

(c) selecting from said temporary array a bundle of demand-routes that include said patching subroute;

(d) calculating a cost gradient for said selected bundle;

(e) whenever a calculated cost gradient is greater than the set best cost gradient, setting the best cost gradient equal to the calculated cost gradient and identifying the selected bundle as the best bundle;

(f) repeating steps (c) through (e) until all combinations of demand-routes that include said patching subroute have been selected;

(g) partitioning the best bundle into a partition that includes said patching subroute and remaining parts of the demand-routes comprising said best bundle;

(h) moving said partitioned patching subroute to said final array;

(i) including said remaining parts in said temporary array;

(j) deleting the demand-routes comprising said best bundle from said temporary array; and, (k) repeating steps (a) through (j) until all patching subroutes in said patching subroute set have been selected.

21. The method as claimed in claim 20, wherein said selected value is zero.

22. The method as claimed in claim 20, including the computer implemented step of:

after step (k), moving the contents of the temporary array to the final array.

23. The method as claimed in claim 18, wherein said express parameter is an integer multiple of said multiplex level ratio.

* * * * *